(12) United States Patent
Priem et al.

(10) Patent No.: US 6,275,243 B1
(45) Date of Patent: Aug. 14, 2001

(54) METHOD AND APPARATUS FOR ACCELERATING THE TRANSFER OF GRAPHICAL IMAGES

(75) Inventors: Curtis Priem, Fremont; Raymond Lim, San Jose, both of CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 09/057,325

(22) Filed: Apr. 8, 1998

(51) Int. Cl.[7] ..................................... G06F 13/16
(52) U.S. Cl. .................. 345/568; 345/503; 345/531; 345/565; 711/202
(58) Field of Search ....................... 345/501–506, 345/520, 521, 515, 516, 517, 531, 565, 566, 568; 711/202, 206

(56) References Cited

U.S. PATENT DOCUMENTS

| | | | |
|---|---|---|---|
| 5,293,593 | * 3/1994 | Hodge et al. | 711/202 |
| 5,307,320 | * 4/1994 | Farrer et al. | 365/230.01 |
| 5,390,308 | * 2/1995 | Ware et al. | 711/5 |
| 5,696,945 | * 12/1997 | Seiler et al. | 345/509 |
| 5,905,509 | * 5/1999 | Jones et al. | 345/520 |
| 5,913,923 | * 6/1999 | Dunlap et al. | 710/100 |
| 5,929,869 | * 7/1999 | Wilde | 345/508 |
| 5,963,984 | * 10/1999 | Garibay, Jr. et al. | 711/206 |
| 5,987,574 | * 11/1999 | Paluch | 711/158 |
| 5,987,582 | * 11/1999 | Devic | 711/206 |
| 6,003,120 | * 12/1999 | Hardin | 711/169 |
| 6,069,638 | * 5/2000 | Porterfield | 345/516 |
| 6,104,417 | * 8/2000 | Nielsen et al. | 345/521 |

* cited by examiner

*Primary Examiner*—Ulka J. Chauhan
(74) *Attorney, Agent, or Firm*—Girard & Equitz LLP (57) ABSTRACT

A graphics accelerator including an address remapping memory which straddles slow address spaces and fast address spaces.

9 Claims, 6 Drawing Sheets

|      | 0 | 255 | 256 | 511 | 512 | 767 | 768 | 1023 | 1024 | 1279 |
|------|---|-----|-----|-----|-----|-----|-----|------|------|------|
| 0    | PAGE 0 | 0 | | 1 | | 2 | | 3 | | 4 |
| 1    |        | 5 | | 6 | | 7 | | 0 | | 1 |
| 2    | PAGE 1 | 2 | | 3 | | 4 | | 5 | | 6 |
| 3    |        | 7 | | 0 | | 1 | | 2 | | 3 |
| 4    | PAGE 2 | 4 | | 5 | | 6 | | 7 | | 0 |
| 5    | PAGE 3 | 1 | | 2 | | 3 | | 4 | | 5 |
| 6    |        | 6 | | 7 | | 0 | | 1 | | 2 |
| 7    | PAGE 4 | 3 | | 4 | | 5 | | 6 | | 7 |
| ⋮ | ⋮ | ⋮ | | ⋮ | | ⋮ | | ⋮ | | ⋮ |
| 1016 | PAGE 635 | 0 | | 1 | | 2 | | 3 | | 4 |
| 1017 |          | 5 | | 6 | | 7 | | 0 | | 1 |
| 1018 | PAGE 636 | 2 | | 3 | | 4 | | 5 | | 6 |
| 1019 |          | 7 | | 0 | | 1 | | 2 | | 3 |
| 1020 | PAGE 637 | 4 | | 5 | | 6 | | 7 | | 0 |
| 1021 | PAGE 638 | 1 | | 2 | | 3 | | 4 | | 5 |
| 1022 |          | 6 | | 7 | | 0 | | 1 | | 2 |
| 1023 | PAGE 639 | 3 | | 4 | | 5 | | 6 | | 7 |

LINES/PAGE CALCULATION:
$8.0 \times 5 / (5 + 5 + 5 + 5 + 5) = 1.60$

AVERAGE NUMBER OF CYCLES FOR VERTICAL LINE:

$$\frac{(10 \text{ CYCLES} * 1 \text{ LINE} + 1 \text{ CYCLE} * (1.60 - 1) \text{ LINES})}{1.60 \text{ LINES}} = 6.63 \text{ CYCLES}$$

| | P0 | P1 | P2 | P3 | | P7 |
|---|---|---|---|---|---|---|
| 0 | 0 | 1 | 2 | 3 | | 4 |
| 1 | 5 | 6 | 7 | 0 | | 1 |
| 2 | 2 | 3 | 4 | 5 | | 6 |
| 3 | 7 | 0 | 1 | 2 | | 3 |
| 4 | 4 | 5 | 6 | 7 | P6 | 0 |
| 5 | 1 | 2 | 3 | 4 | | 5 |
| 6 | 6 | 7 | 0 | 1 | | 2 |
| 7 | 3 | 4 | 5 | 6 | | 7 |
| | P4 | P5 | P6 | P7 | P5 | 4 |
| 8 | 0 | 1 | 2 | 3 | | 1 |
| 9 | 5 | 6 | 7 | 0 | | 6 |
| 10 | 2 | 3 | 4 | 5 | P4 | 3 |
| 11 | 7 | 0 | 1 | 2 | | |
| 12 | 4 | 5 | 6 | 7 | | |

LINES/PAGE FOR RAM 64 × 3 (A[2:0] → D[2:0]):
12.8 * 5 / (2 + 2 + 2 + 4) = 5.33 LINES/PAGE

AVERAGE NUMBER OF CYCLES FOR VERTICAL LINE:
(10 CYCLES * 1 LINE + 1 CYCLE * (5.33 − 1) LINES / 5.33 LINES = 2.69 CYCLES

METHOD AND APPARATUS FOR ACCELERATING THE TRANSFER OF GRAPHICAL IMAGES

BACKGROUND OF THE INVENTION

1. Field Of The Invention

This invention relates to computer systems, and more particularly, to methods and apparatus for varying the arrangement of frame buffer memory to increase the speed of vertical access.

2. History Of The Prior Art

A frame buffer provides storage for pixel data which is to be displayed on a computer output display. Frame buffer memory is conventionally two dimensional dynamic random access memory or some modification thereof. Frame buffer memory is of some fixed size in each of the two dimensions. The size is selected as a compromise to best handle the various display formats which may be presented on an output display. Pixel data describing a frame is stored linearly in a frame buffer beginning at the start of some first row, continuing through that row to the end, starting again at the beginning of the next row, and continuing this pattern to the end of the last row of the memory array.

Data is transferred to a frame buffer by addressing rows and columns. When a sequence of data is being placed in different columns of the same row of a frame buffer, the time required to switch between columns is usually only a single cycle. This occurs because column selection requires only selecting a different accessing address using a multiplexor. However, when accessing a frame buffer, the time required to switch between rows is typically ten cycles. This occurs because the operation requires charging of capacitors involved in row select operations.

With linear memory storing pixel data, selection of a different column proceeds rapidly while of a different row is very time consuming. This is satisfactory for frame buffer clearing which takes place linearly. Graphics operations, however, require as much vertical as horizontal movement. Therefore, the arrangement of frame buffers causes graphics operations to proceed slowly.

It is desirable to increase the speed of graphics operations in computers.

Summary Of The Invention

This and other desirable results of the present invention are realized by a circuitry and a method for rearrangement the storage of pixel data in frame buffer memory so that movement in the vertical direction on an output display requires less movement between pages in the physical memory used for the frame buffer. This is accomplished by circuitry which rearranges addressing to physical memory to place pixel data in positions where it is less likely that vertical movements will require page boundary crossings.

These and other objects and features of the invention will be better understood by reference to the detailed description which follows taken together with the drawings in which like elements are referred to by like designations throughout the several views.

DETAILED DESCRIPTION

Figure 1:
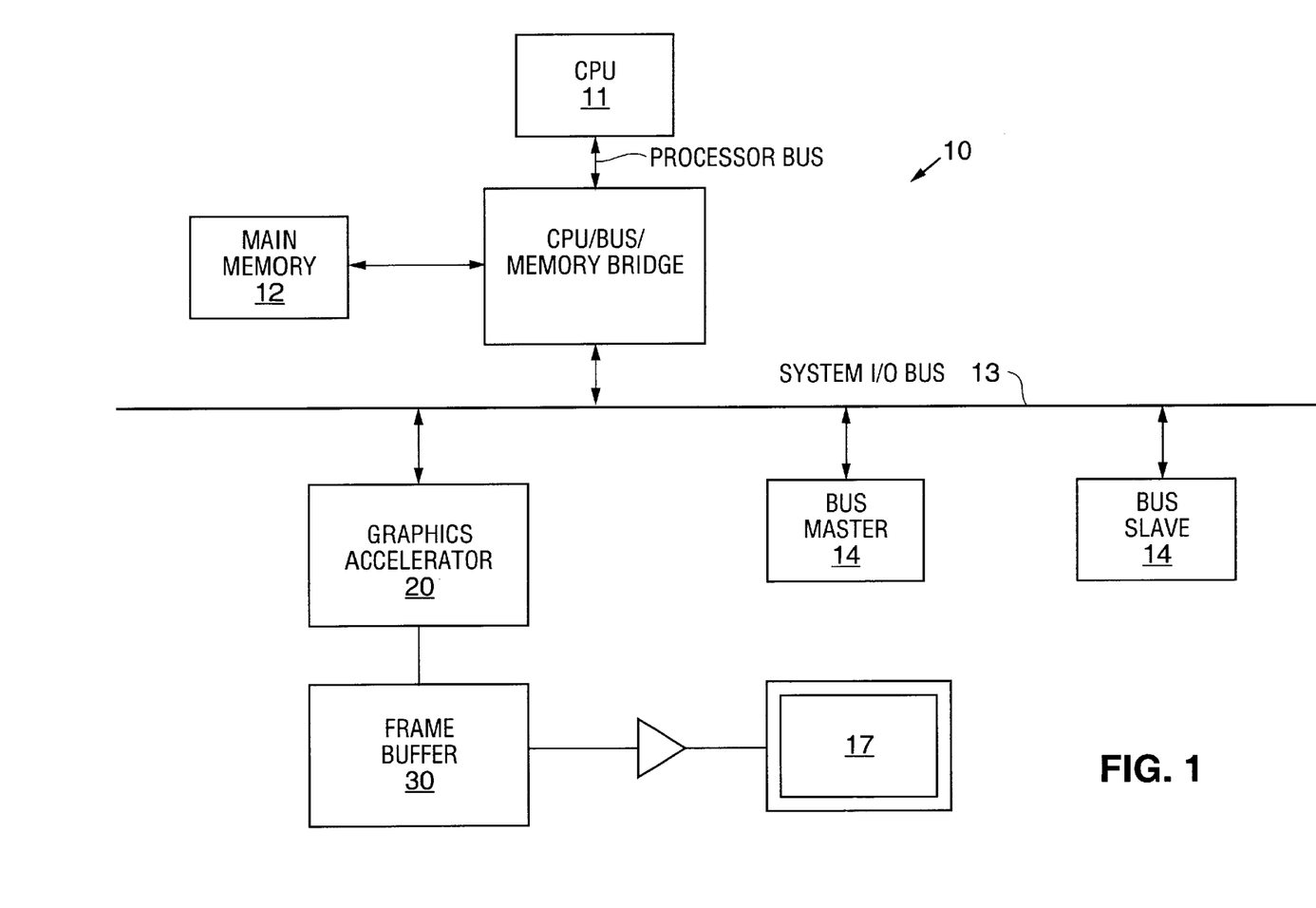
FIG. 1 is a block diagram describing a computer utilizing the present invention.

FIG. 1 is a block diagram illustrating a computer 10 which may utilize the present invention. The computer 10 includes a central processing unit 11, a system I/O bus 13, main memory 12 joined to the central processing unit 11 by a high speed memory bus and CPU/bus/memory bridge which controls access to the system I/O bus 13, and various I/O devices 14 and 20. Typically, the I/O devices may include devices such as a graphics accelerator circuit 20 for manipulating the graphics data furnished to the accelerator to generate pixel data which is stored in a frame buffer 30 and transferred by a digital-to-analog converter circuit to operate an output display 17.

Figure 2:
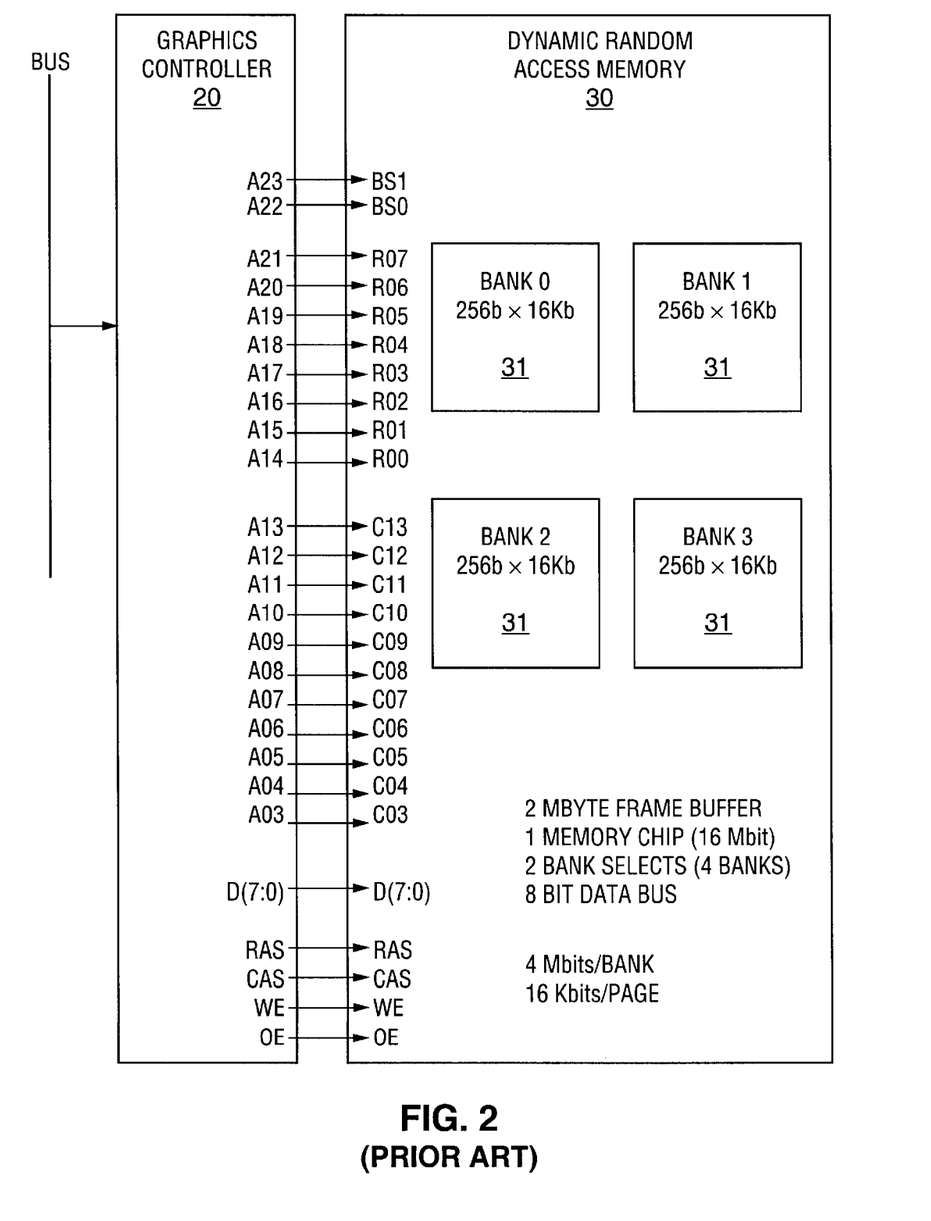
FIG. 2 illustrates a linear frame buffer memory array used in the prior art.

FIG. 2 is a block diagram illustrating a graphics accelerator 20 and a frame buffer 30 which are used in prior art arrangements. The particular numbers (shown in FIG. 2) of banks, of address lines, of memory elements in each bank are assumed for the purposes of illustrating the operation of the prior art embodiment with understandable values. Many of the specific details may change with particular circuitry which follows the same basic arrangement and operating in essentially the same manner.

In the embodiment shown, the graphics controller 20 sends pixel data on eight individual lines indicated as D(7:0) to the random access memory 30 which is utilized as a frame buffer. The address to which data is transferred is selected by a number of address lines A03 through A23 which are connected to input terminals on the memory 30. Since eight bits are accessed together, the three lowest address lines need not be included. In the example, address lines A03 through A13 are connected to column select lines at the terminals C03 through C13, respectively. The address lines A14 through A21 are connected to row select lines at the terminals R00 through R07, respectively. The address lines A22 and A23 are connected to bank select lines at the terminals BS0 and BS1. The bank select lines allow the graphics controller to address any one of the four banks of memory 0–3, each of which is labeled 31 in the figure and includes 4Mbits of memory.

The operations of the memory 30 are controlled by signals on a number of control lines RAS, CAS, WE, and OE. These are, respectively, row address strobe, column address strobe, write enable and output enable. Control signals on these lines function in a manner well known to the prior art.

The amount of memory in each of the banks 31 is fixed. The amount of memory in each row and each column of each bank 31 is fixed. As mentioned above, in accessing a row, approximately ten cycles are required because of the well known requirements of each row access strobe operation while accessing a column requires only one cycle. Thus, when it is necessary to access a different row within a single bank of the memory 30, a row address strobe (RAS) operation is required which slows operations significantly. It should be noted that each individual bank includes its own circuitry for latching rows being accessed, and all of the banks may be latching different rows at any time.

Consequently, switching from an access involving a row in one bank of memory to an access in a different bank of memory whose row has not changed does not require a new RAS operation.

While applications which involve mainly displaying data linearly on an output display (such as frame buffer clearing operations) work well with linear memory, graphics operations require constant operations in both the horizontal and vertical directions. Consequently, graphical operations are slowed by linear frame buffer memory.

Figure 3:
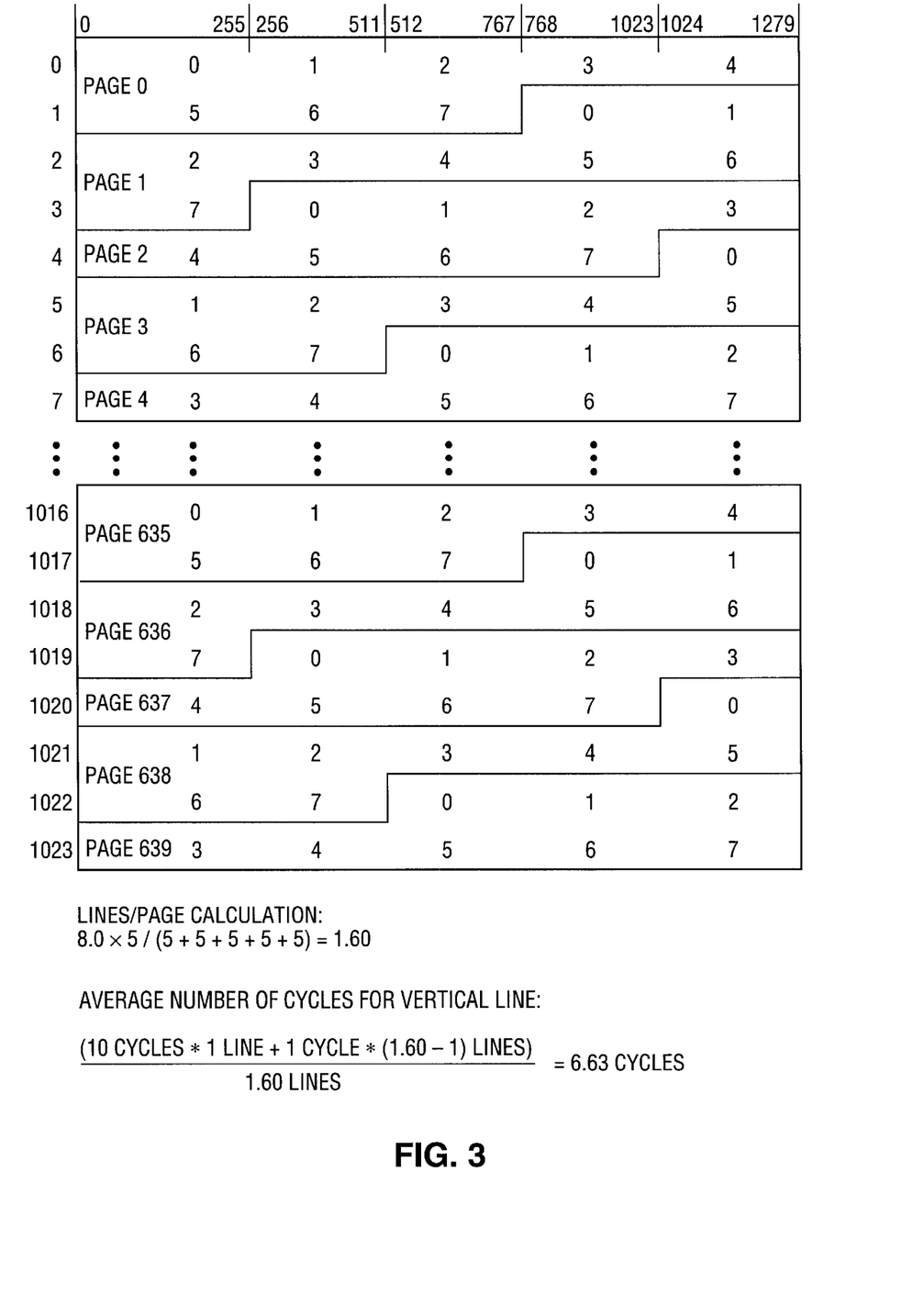
FIG. 3 is an illustration of the layout of a frame buffer to present one particular format.

FIG. 3 illustrates just how a particular array of frame buffer memory for a particular display format utilizes memory in a dynamic random access memory array. The frame buffer format shown displays 1280 pixels horizontally by 1024 pixel vertically. The frame buffer is shown as divided into blocks each of which is 256 pixels wide and eight bits deep and one line in height. Each of the lines of the horizontal lines of pixels is 1280 pixels in length while the row of memory into which the pixel data in written is substantially longer. As may be seen, for a format of 1280×1024, eight block of pixel data may be stored in each individual row of physical memory (one page). Consequently, whenever an access requires movement in the vertical direction, the black lines indicating a page crossing are crossed more often than once for every two rows displayed.

FIG. 3 includes calculations which will be obvious to those skilled in the art and illustrate how often a new row is accessed and a RAS operation is necessary in prior art memory arrays. The calculations show that for the example given, a new row access is required in drawing a vertical line once every 1.60 lines of the frame buffer. Moreover, for the example given, it requires approximately 6.33 cycles for each vertical line moved on the display. This is very time consuming.

Figure 4:
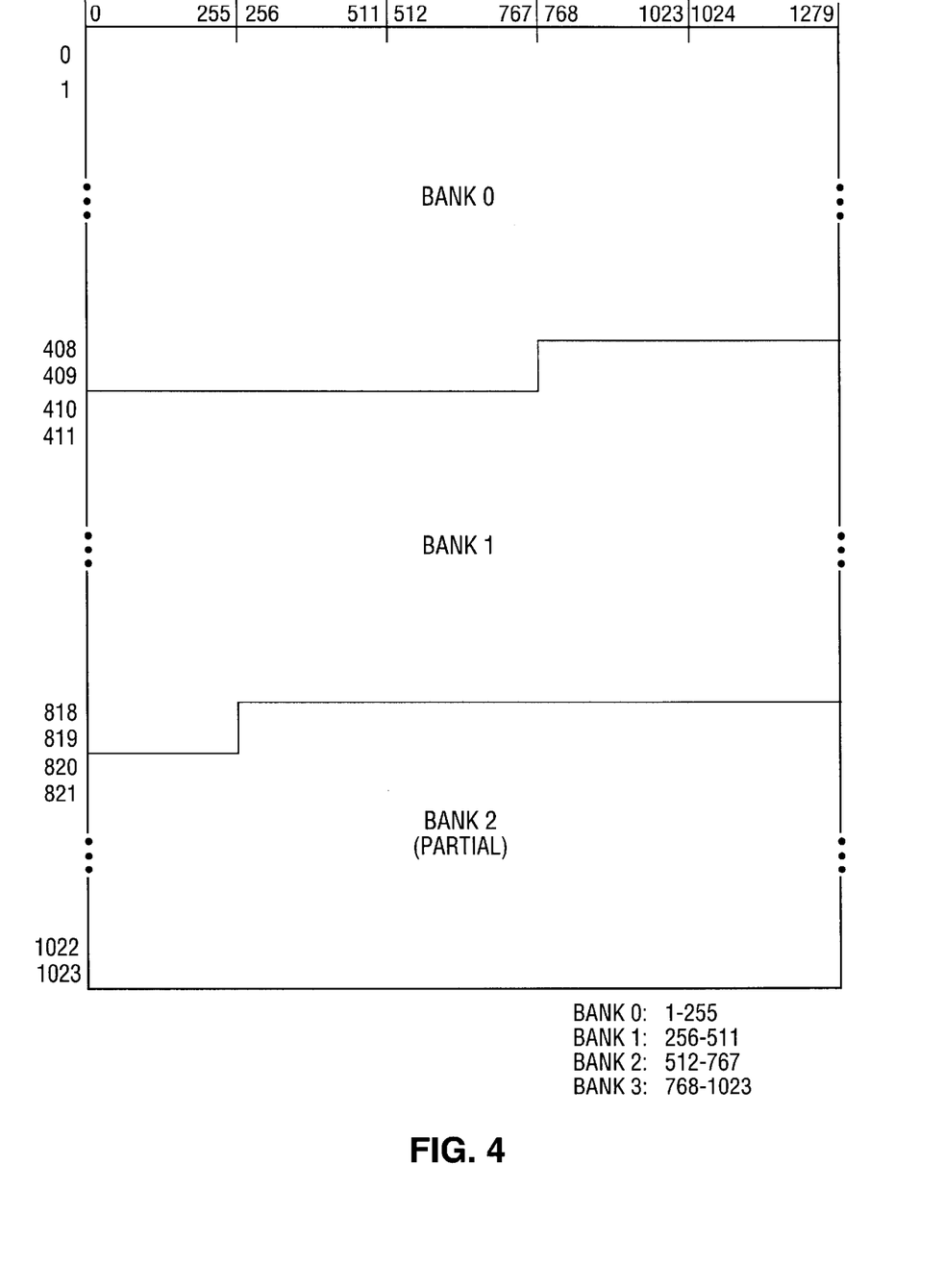
FIG. 4 is an illustration of the layout of a frame buffer in different banks of memory to present one particular format.

FIG. 4 illustrates memory bank usage for a frame buffer where the upper two address bits control the bank select in a conventional linear array of dynamic random access memory. As may be seen, a little more than two and one-half banks are required for the frame buffer which stores pixel data for the particular format. Each of the banks can have an active row access. Consequently, if an access is made to bank 0, then bank 1 to the old row address in bank 1, no RAS operation is needed.

Figure 5:
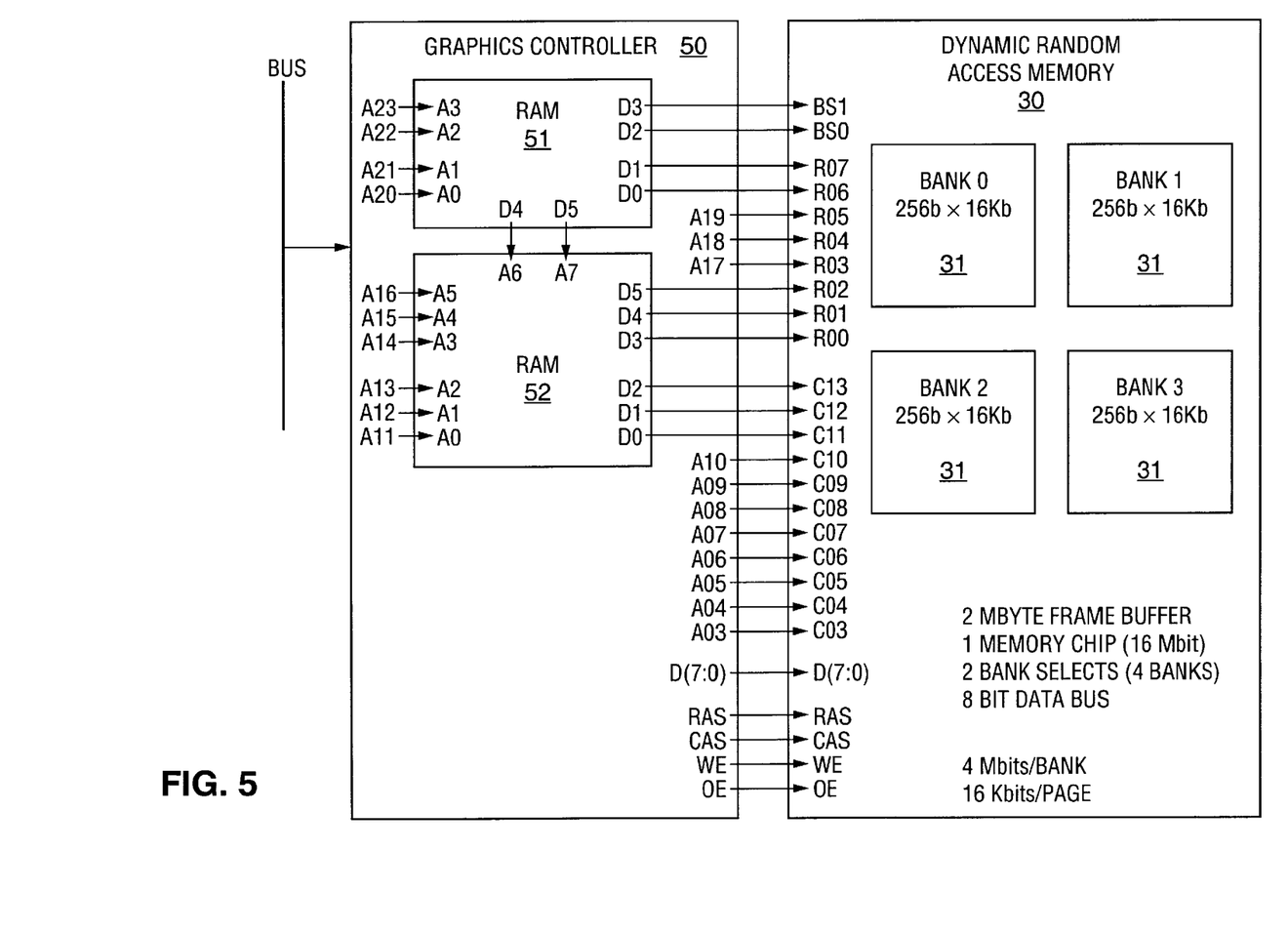
FIG. 5 illustrates a frame buffer memory array which may be used in the present invention.

FIG. 5 is a block diagram illustrating a graphics accelerator 50 and a frame buffer 30 designed in accordance with the present invention. Again, the particular numbers (shown in FIG. 5) of banks, of address lines, of memory elements in each bank are assumed for the purposes of illustrating the operation of the embodiment of the present invention with readily understandable values. Many of the specific details may change with particular circuitry which follows the same basic arrangement and operates in essentially the same manner.

In the embodiment shown, the graphics controller 50 sends pixel data on eight individual lines again indicated as D(7:0) to the random access memory 30 which is utilized as a frame buffer. The address to which data is transferred is selected by a number of address lines A03 through A23. In contrast to the arrangement of FIG. 2, only certain of the address lines are directly connected to input terminals on the memory 30. Again, since eight bits are accessed together, the three lowest address lines need not be included. In the example, address lines A03 through A10 are connected to column select lines at the terminals C03 through C10 on the memory circuit 30, respectively. The address lines A17 through A 19 are connected to row select lines at the terminals R03 through R05, respectively. The address lines A11 through A16 are connected to a first random access memory array 52 at terminals A0–A5, respectively. The random access memory 52 may be programmed to reorder the blocks addressed by address lines A11 through A16. The output lines of the random access memory 52 at the terminals D0 through D2 are connected to column address terminals C11 through C13 on the memory array 30, and the terminals D3 through D5 are connected to row address terminals R00 through R02 on the memory array 30. Notice that some of the data output lines are connected to the row address and some are connected to the column which allows the reordering of blocks within both the column and the rows.

The address lines A20 through A23 are connected to input terminals A0 through A3 on a second random access memory array 51. The random access memory 51 may also be programmed to reorder the rows within the banks addressed by address lines A20 through A23. The terminals D0 and D1 are connected to row address terminals R06 and R07 on the memory array 30. The terminals D2 and D3 are connected to bank select terminals BS0 and BS1. As in FIG. 2, the bank select lines allow the graphics controller 50 to address any one of the four banks of memory 0–3, each of which is labeled 31 in the figure and includes 4Mbits of memory. Notice that some of the data output lines are connected to the row address and some are connected to the bank select which allows the reordering of rows within the banks and the rows.

The terminals D4 and D5 on the random access memory 51 are connected to the terminals A6 and A7 on the random access memory 52. Notice that selected rows and banks can select the tiling options that are stored in RAM 52 so that throughout the frame buffer the organization can change.

The operations of the memory 30 are controlled as in FIG. 2 by signals on a number of control lines RAS, CAS, WE, and OE. These are, respectively, row address strobe, column address strobe, write enable and output enable. Control signals on these lines function in a manner well known to the prior art.

Figure 6:
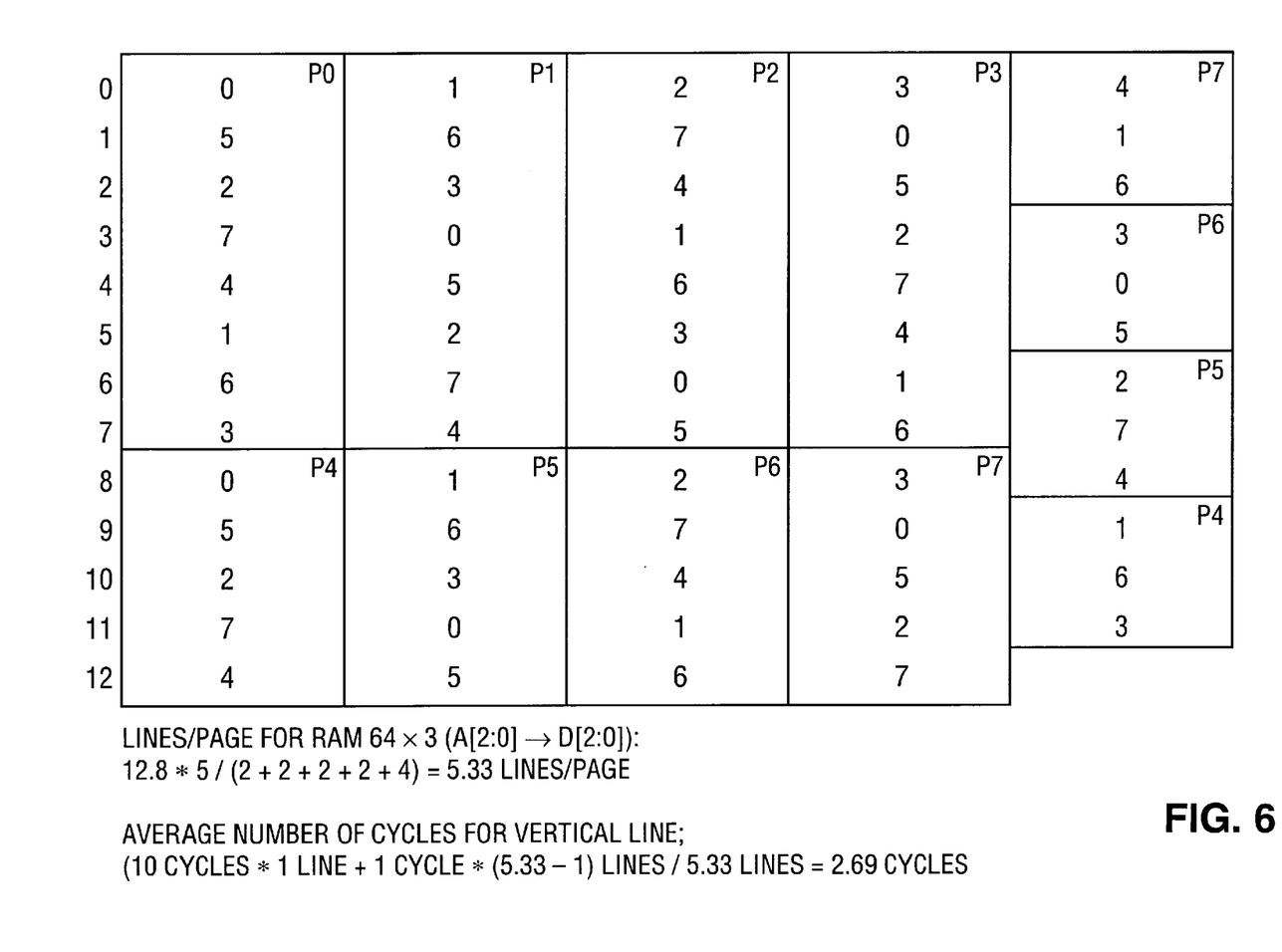
FIG. 6 is an illustration of the layout of a frame buffer to present one particular format which may be used in the present invention.

FIG. 6 illustrates the layout of the blocks within the frame buffer for the new invention described in FIG. 5. The frame buffer format shown displays 1280 pixels horizontally by 12 pixel vertically. The frame buffer is shown as divided into blocks each of which is 256 pixels wide and eight bits deep and one line in height. The new arrangement of the blocks create vertical pages of up to eight lines high.

FIG. 6 includes calculations which will be obvious to those skilled in the art and illustrate how often a new row is accessed and a RAS operation is necessary in the present invention. The calculations show that for the example given, a new row access is required in drawing a vertical line once every 5.33 lines of the frame buffer. Moreover, for the example given, it requires approximately 2.69 cycles for each vertical line moved on the display. This is very much faster than the prior art arrangement.

The value stored in RAM 51 must be selected so that no two address locations map onto the same row. The value stored in RAM 52 must be selected so that no two address locations not map onto the same block. In order to assure this. The values in RAM 51 must be unique. Likewise, the values in RAM 52 must be unique.

The following is an example of the mapping required to guarantee uniqueness in RAM 52 for FIG. 6:

| Addr | 64 × 6 RAM Data[5:0] | 64 × 3 RAM Data[5:3] |
|------|----------------------|----------------------|
| 0    | 0 * 8 + 0 = 0        | 0                    |
| 1    | 1 * 8 + 1 = 9        | 1                    |
| 2    | 2 * 8 + 2 = 18       | 2                    |
| 3    | 3 * 8 + 3 = 27       | 3                    |
| 4    | 7 * 8 + 4 = 60       | 7                    |
| 5    | 0 * 8 + 5 = 5        | 0                    |
| 6    | 1 * 8 + 6 = 14       | 1                    |
| 7    | 2 * 8 + 7 = 23       | 2                    |
| 8    | 3 * 8 + 0 = 24       | 3                    |
| 9    | 7 * 8 + 1 = 57       | 7                    |
| 10   | 0 * 8 + 2 = 2        | 0                    |
| 11   | 1 * 8 + 3 = 11       | 1                    |
| 12   | 2 * 8 + 4 = 20       | 2                    |
| 13   | 3 * 8 + 5 = 29       | 3                    |
| 14   | 7 * 8 + 6 = 62       | 7                    |
| 15   | 0 * 8 + 7 = 7        | 0                    |
| 16   | 1 * 8 + 0 = 8        | 1                    |
| 17   | 2 * 8 + 1 = 17       | 2                    |
| 18   | 3 * 8 + 2 = 26       | 3                    |
| 19   | 6 * 8 + 3 = 51       | 6                    |
| 20   | 0 * 8 + 4 = 4        | 0                    |
| 21   | 1 * 8 + 5 = 13       | 1                    |
| 22   | 2 * 8 + 6 = 22       | 2                    |
| 23   | 3 * 8 + 7 = 31       | 3                    |
| 24   | 6 * 8 + 0 = 48       | 6                    |
| 25   | 0 * 8 + 1 = 1        | 0                    |
| 26   | 1 * 8 + 2 = 10       | 1                    |
| 27   | 2 * 8 + 3 = 19       | 2                    |
| 28   | 3 * 8 + 4 = 28       | 3                    |
| 29   | 6 * 8 + 5 = 53       | 6                    |
| 30   | 0 * 8 + 6 = 6        | 0                    |
| 31   | 1 * 8 + 7 = 15       | 1                    |
| 32   | 2 * 8 + 0 = 16       | 2                    |
| 33   | 3 * 8 + 1 = 25       | 3                    |
| 34   | 5 * 8 + 2 = 42       | 5                    |
| 35   | 0 * 8 + 3 = 3        | 0                    |
| 36   | 1 * 8 + 4 = 12       | 1                    |
| 37   | 2 * 8 + 5 = 21       | 2                    |
| 38   | 3 * 8 + 6 = 30       | 3                    |
| 39   | 5 * 8 + 7 = 47       | 5                    |
| 40   | 4 * 8 + 0 = 32       | 4                    |
| 41   | 5 * 8 + 1 = 41       | 5                    |
| 42   | 6 * 8 + 2 = 50       | 6                    |
| 43   | 7 * 8 + 3 = 59       | 7                    |
| 44   | 5 * 8 + 4 = 44       | 5                    |
| 45   | 4 * 8 + 5 = 37       | 4                    |
| 46   | 5 * 8 + 6 = 46       | 5                    |
| 47   | 6 * 8 + 7 = 55       | 6                    |
| 48   | 7 * 8 + 0 = 56       | 7                    |
| 49   | 4 * 8 + 1 = 33       | 4                    |
| 50   | 4 * 8 + 2 = 34       | 4                    |
| 51   | 5 * 8 + 3 = 43       | 5                    |
| 52   | 6 * 8 + 4 = 52       | 6                    |
| 53   | 7 * 8 + 5 = 61       | 7                    |
| 54   | 4 * 8 + 6 = 38       | 4                    |
| 55   | 4 * 8 + 7 = 39       | 4                    |
| 56   | 5 * 8 + 0 = 40       | 5                    |
| 57   | 6 * 8 + 1 = 49       | 6                    |
| 58   | 7 * 8 + 2 = 58       | 7                    |
| 59   | 4 * 8 + 3 = 35       | 4                    |
| 60   | 4 * 8 + 4 = 36       | 4                    |
| 61   | 5 * 8 + 5 = 45       | 5                    |
| 62   | 6 * 8 + 6 = 54       | 6                    |
| 63   | 7 * 8 + 7 = 63       | 7                    |

If the blocks are organized as in FIG. 6, only the upper three data bits D3–D5 need to be connected to R00 through R02. The address bits A11 through A13 can be directly connected to C11 through C13 because the values applied to A0 through A2 are the same as the values generated by Do through D2. The RAM can therefor be reduced from 64×6 bits to 64×3 bits.

It will obvious to one skilled in the art that the rows within banks can be reorganized in the same manner by programming RAM 51. This allows interleaving of banks and reorganization of rows to minimize the page crossings of multiple graphics accelerators when accessing the DRAM simultaneously.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An engine for use with a memory having storage locations and memory lines, said engine comprising:

circuitry configured to translate addresses to the memory to generate translated addresses to place data in locations in the memory where it is less likely that access to adjacent locations will require boundary crossings that have longer access times than non-boundary crossing access times; and a first set of outputs which assert values of a first subset of original address bits, wherein the first set of outputs are configured to be coupled to a first subset of the memory lines, wherein the circuitry configured to translate addresses includes lookup table circuitry having a first set of inputs coupled to receive a second subset of original address bits, and a second set of outputs configured to be coupled to a second subset of the memory lines, wherein the lookup table circuitry is configured to assert a different output value to the second set of outputs in response to assertion of each input value to the first set of inputs, wherein no two input values at the first set of inputs produce the same output value at the second set of inputs, the first subset of original address bits and the second subset of original address bits together determine an address, and each said output value together with the first subset of original address bits determines a translated address corresponding to said address.

2. The engine of claim 1, wherein the lookup table circuitry is memory circuitry configured such that each said different output value is read from the memory circuitry and asserted at the second set of outputs in response to assertion of said each input value at the first set of inputs.

3. The engine of claim 1, wherein the memory lines include bank select lines.

4. The engine of claim 1, wherein the memory lines include row select lines.

5. The engine of claim 2, wherein the memory lines include column select lines.

6. A graphics system, comprising:

a memory having storage locations and memory lines; and a graphics accelerator coupled to the memory, wherein the graphics accelerator is configured to translate addresses to the memory to generate translated addresses to place data in locations in the memory where it is less likely that access to adjacent locations will require boundary crossings that have longer access times than non-boundary crossing access times, and wherein the graphics accelerator comprises:

a first set of outputs coupled to assert values of a first subset of original address bits to a first subset of the memory lines, and lookup table circuitry having a first set of inputs coupled to receive a second subset of original address bits, and a second set of outputs coupled to a second subset of the memory lines, wherein the lookup table circuitry is configured to assert a different output value to the second set of outputs in response to assertion of each input value to the first set of inputs, wherein no two input values at the first set of inputs produce the same output value at the second set of inputs, the first subset of original address bits and the second subset of original address bits together determine an address, and each said output value together with the first subset of original address bits determines a translated address corresponding to said address.

7. The system of claim 6, wherein the lookup table circuitry is memory circuitry configured such that each said different output value is read from the memory circuitry and asserted at the second set of outputs in response to assertion of said each input value at the first set of inputs.

8. A method for asserting address bits from an engine to memory lines, wherein the engine includes lookup table circuitry having inputs, said method comprising the steps of:

(a) asserting values of a first subset of original address bits, as a first set of output values, to a first subset of the memory lines; and (b) translating input values of a second subset of original address bits to generate a second set of output values and asserting the second set of output values to a second subset of the memory lines, by asserting the input values of the second subset of original address bits to the inputs of the lookup table circuitry and in response to said input values of the second subset of original address bits, asserting the second set of output values from the lookup table circuitry to the second subset of the memory lines, such that no two of the input values of the second subset of original address bits produce the same output value, and wherein the first set of output values and the second set of output values determine translated addresses to place data in locations in a memory where it is less likely that access to adjacent locations will require boundary crossings that have longer access times than non-boundary crossing access times.

9. The method of claim 8, wherein the lookup table circuitry is memory circuitry having inputs, and step (b) includes the step of:

asserting the input values of the second subset of original address bits to the inputs of the memory circuitry, and in response, reading the second set of output values from the memory circuitry and asserting said second set of output values to the second subset of the memory lines.

* * * * *